United States Patent
Mizukami et al.

(10) Patent No.: US 8,525,374 B2
(45) Date of Patent: *Sep. 3, 2013

(54) ELECTRIC MOTOR, AND ELECTRIC DEVICE HAVING THE MOTOR

(75) Inventors: Hirofumi Mizukami, Fukui (JP); Akihiko Watanabe, Fukui (JP)

(73) Assignee: Panasonic Corporation, Osaka (JP)

( * ) Notice: Subject to any disclaimer, the term of this patent is extended or adjusted under 35 U.S.C. 154(b) by 307 days.

This patent is subject to a terminal disclaimer.

(21) Appl. No.: 12/666,072

(22) PCT Filed: Jun. 24, 2008

(86) PCT No.: PCT/JP2008/001626
§ 371 (c)(1),
(2), (4) Date: May 26, 2010

(87) PCT Pub. No.: WO2009/001546
PCT Pub. Date: Dec. 31, 2008

(65) Prior Publication Data
US 2010/0253158 A1 Oct. 7, 2010

(30) Foreign Application Priority Data
Jun. 25, 2007 (JP) ................... 2007-165804

(51) Int. Cl.
*H02K 15/02* (2006.01)
(52) U.S. Cl.
USPC ............................................. 310/43; 310/90
(58) Field of Classification Search
USPC ...................... 310/43, 90, 263, 260
See application file for complete search history.

(56) References Cited

U.S. PATENT DOCUMENTS

| | | | | |
|---|---|---|---|---|
| 4,263,711 A | * | 4/1981 | Sakano et al. | 29/597 |
| 5,684,352 A | * | 11/1997 | Mita et al. | 310/156.56 |
| 5,704,111 A | * | 1/1998 | Johnson et al. | 29/598 |
| 5,821,652 A | | 10/1998 | Hyypio | |
| 6,002,185 A | * | 12/1999 | Nakao et al. | 310/43 |
| 6,069,431 A | * | 5/2000 | Satoh et al. | 310/260 |
| 6,673,463 B1 | * | 1/2004 | Onishi et al. | 428/480 |

(Continued)

FOREIGN PATENT DOCUMENTS

| GB | 1 508 793 | 4/1978 |
|---|---|---|
| JP | 2-133047 A | 5/1990 |

(Continued)

OTHER PUBLICATIONS

International Search Report for International Application No. PCT/JP2008/001626, Aug. 12, 2008, Panasonic Corporation.

(Continued)

*Primary Examiner* — Dang Le
(74) *Attorney, Agent, or Firm* — RatnerPrestia

(57) ABSTRACT

Provided is an electric motor that has a stator including a stator iron core having a stator winding, a rotor including a rotary member and a shaft, a bearing for supporting the shaft, and a bracket for fixing the bearing. Further included is an impedance adjusting member for adjusting at least one impedance of the impedance between the stator winding and the inner ring of the bearing, and the impedance between the stator winding and the outer ring of the bearing. The impedance adjusting member is a matching member for matching the individual impedances. The matching member is a capacitor interposed between the stator iron core and the bracket.

18 Claims, 12 Drawing Sheets

(56) References Cited

U.S. PATENT DOCUMENTS

| | | | |
|---|---|---|---|
| 6,844,636 B2 * | 1/2005 | Lieu et al. | 310/43 |
| 7,812,485 B2 * | 10/2010 | Bi et al. | 310/51 |
| 2005/0253480 A1 | 11/2005 | Pizzichil | |
| 2006/0186746 A1 | 8/2006 | Nanbu et al. | |
| 2007/0290570 A1 | 12/2007 | Okada et al. | |
| 2011/0234026 A1 * | 9/2011 | Mizukami et al. | 310/43 |
| 2012/0038229 A1 * | 2/2012 | Watanabe et al. | 310/43 |

FOREIGN PATENT DOCUMENTS

| | | |
|---|---|---|
| JP | 2000-152564 A | 5/2000 |
| JP | 2000-152564 A | 5/2000 |
| JP | 2003-235184 A | 8/2003 |
| JP | 2005-198374 A | 7/2005 |
| JP | 2006-187144 A | 7/2006 |
| JP | 2007-159302 A | 6/2007 |
| JP | 2007-159302 A | 6/2007 |
| WO | WO 2006/090489 A1 | 8/2006 |

OTHER PUBLICATIONS

JP Office Action for 2009-520346, Jun. 28, 2011.
Supplementary European Search Report with European Search Opinion for EP 08 76 4209, Jul. 31, 2012.

* cited by examiner

ELECTRIC MOTOR, AND ELECTRIC DEVICE HAVING THE MOTOR

THIS APPLICATION IS A U.S. NATIONAL PHASE APPLICATION OF PCT INTERNATIONAL APPLICATION PCT/JP2008/001626.

TECHNICAL FIELD

The present invention relates to an electric motor and an electric device having the motor, and more particularly to an electric motor and an electric device having the motor improved so as to prevent occurrence of electrolytic corrosion of its bearing.

BACKGROUND ART

Recently, electric motors tend to be driven by an inverter of pulse width modulation (PWM) system. In the case of such PWM system inverter driving, the neutral point potential of the winding is not zero, but a common mode voltage is generated. By this common mode voltage, a potential difference occurs between the inner ring and the outer ring of the bearing (which is called an axial voltage hereinafter). The axial voltage contains high frequency components due to switching, and when the axial voltage reaches a dielectric breakdown voltage of the oil film in the bearing, a high frequency current flows into the bearing, and an electrolytic corrosion occurs in the inside of the bearing. When the electrolytic corrosion is progressed, a wavy abrasion phenomenon may occur inside of the inner ring or the outer ring of the bearing, which may lead to occurrence of abnormal sound, and it is one of the principal causes of troubles in an electric motor (see, for example, patent document 1).

A particularly likely condition to cause an electrolytic corrosion is known to occur where the motor applied voltage is high (for example, in commercial power source 240 V district), the temperature is relatively low, and the motor is operated for a long time in a small variation state of rotating speed.

Conventionally, to prevent the electrolytic corrosion, the following measures have been proposed.

(1) To set the inner ring and the outer ring of the bearing in conductive state.

(2) To set the inner ring and the outer ring of the bearing in insulated state.

(3) To lower the axial voltage.

A specific method of (1) is, for example, to use a conductive lubricant for the bearing. However, the conductive lubricant is worsened in conductivity in the course of time, or is inferior in sliding reliability. Alternatively, a brush may be installed on a rotation shaft to set in conductive state, but this method requires a brush abrasive powder or a space.

A specific method of (2) is, for example, to change iron balls in the bearing to ceramic balls. This method is very effective for preventing electrolytic corrosion, but it is very costly and cannot be applied in general electric motors.

A specific method of (3) is, for example, to install a voltage dividing circuit for lowering the axial voltage in parallel to the axial voltage portion. More specifically, a metal disk (conductor) is provided in the shaft of the electric motor, and this disk is brought closer to a bracket to form an electrostatic capacity. A method of lowering the axial voltage by such configuration is known (see, for example, patent document 2).

However, in the configuration as disclosed in patent document 2, it is necessary to provide the shaft with a disk, and the number of components and the number of manufacturing processes are increased. Further, to increase the electrostatic capacity, it is necessary to increase the surface area of, for example, the disk, and a large structure is needed, and it is not suited to downsizing of the electric motor. Therefore, in consideration of application in small-sized electric motor or mass production, it was very difficult to employ the technique as disclosed in patent document 2.

Patent document 1: Japanese Patent Application Unexamined Publication No. 2007-159302

Patent document 2: Japanese Patent Application Unexamined Publication No. 2000-152564

SUMMARY OF THE INVENTION

The electric motor of the present invention comprises a stator including a stator iron core having a stator winding, a rotor including a rotary member holding a plurality of permanent magnets in a peripheral direction opposite to the stator and a shaft tightening the rotary member so as to penetrate through the center of the rotary member, a bearing for supporting the shaft, and a bracket for fixing the bearing, and further comprises an impedance adjusting member for adjusting at least one impedance of the impedance between the stator winding and the inner ring of the bearing, and the impedance between the stator winding and the outer ring of the bearing.

This impedance adjusting member is a matching member for matching the impedance between the stator iron core and the inner ring of the bearing, with the impedance between the stator iron core and the outer ring of the bearing.

In such configuration, by properly selecting the impedance adjusting member, the impedance between the stator iron core and the inner ring of the bearing, and the impedance between the stator iron core and the outer ring of the bearing may be matched. By thus matching the individual impedances, when the electric motor is driven, the potentials occurring in the inner ring and the outer ring of the bearing due to high frequency current may be approximated or matched exactly. As a result, it is effective to reduce the axial voltage which is the potential difference between the inner ring and the outer ring of the bearing. Thus, in such simple configuration, it is possible to prevent electrolytic corrosion occurring inside of the bearing.

The matching member is a member having an impedance component interposed between the stator iron core and the bracket.

The stator iron core and the bracket are electrically connected with each other by the member having an impedance component.

The member having an impedance component is at least one of a dielectric element and a resistive element.

On the basis of the impedance between the stator iron core and the inner ring of the bearing as the reference, the impedance between the stator iron core and the outer ring of the bearing is set in a range of plus 10% to minus 75% of the reference.

In such configuration, without requiring a large device, electrolytic corrosion occurring inside of the bearing can be prevented in a simple structure, and an electric motor suited to a small size can be realized.

The stator has a stator winding applied on a stator iron core insulated by a resin, and this resin may be used as an impedance adjusting member, and the dielectric constant of the resin may be set at 3.0 or less.

The stator winding of the stator iron core may be molded and formed integrally by an insulating resin to compose a housing member, and the bearing is formed of a pair of bearings, one bearing being provided inside of the housing member and other bearing being fixed to the bracket, and the insulating resin may be used as an impedance adjusting member, and the dielectric constant of the insulating resin may be set at 3.0 or less.

The matching member may be also a member having an impedance component interposed between the outer circumference of the rotary member and the shaft.

Also in such configuration, without requiring a large device, electrolytic corrosion occurring inside of the bearing can be prevented in a simple structure, and an electric motor suited to a small size can be realized.

The electric device of the present invention is a device incorporating such electric motor.

DESCRIPTION OF REFERENCE MARKS

| | |
|---|---|
| 10 | Stator |
| 11 | Stator iron core |
| 12 | Stator winding |

-continued

DESCRIPTION OF REFERENCE MARKS

| | |
|---|---|
| 13 | Insulating resin (molding material) |
| 14 | Rotor |
| 15 | Bearing |
| 16 | Shaft |
| 17 | Bracket |
| 18 | Printed circuit board |
| 20 | Grounding cable |
| 21, 211 | Resin (insulator) |
| 30 | Rotary member |
| 31 | Rotor iron core |
| 32 | Ferrite resin magnet |
| 40 | Capacitor |
| 41 | Through-hole |
| 42 | Connection pin |
| 110, 111 | Lead wire |
| 112 | Conductive tape |
| 120 | Probe |
| 121 | Leading end of probe |
| 122 | Ground of probe |
| 130 | Digital oscilloscope |
| 140 | Insulating transformer |
| 150 | Leak current high tester |
| 311 | Insulating resin |

PREFERRED EMBODIMENTS FOR CARRYING OUT THE INVENTION

Preferred embodiments for carrying out the present invention are described specifically below while referring to the accompanying drawings.

Preferred Embodiment 1

Figure 1:
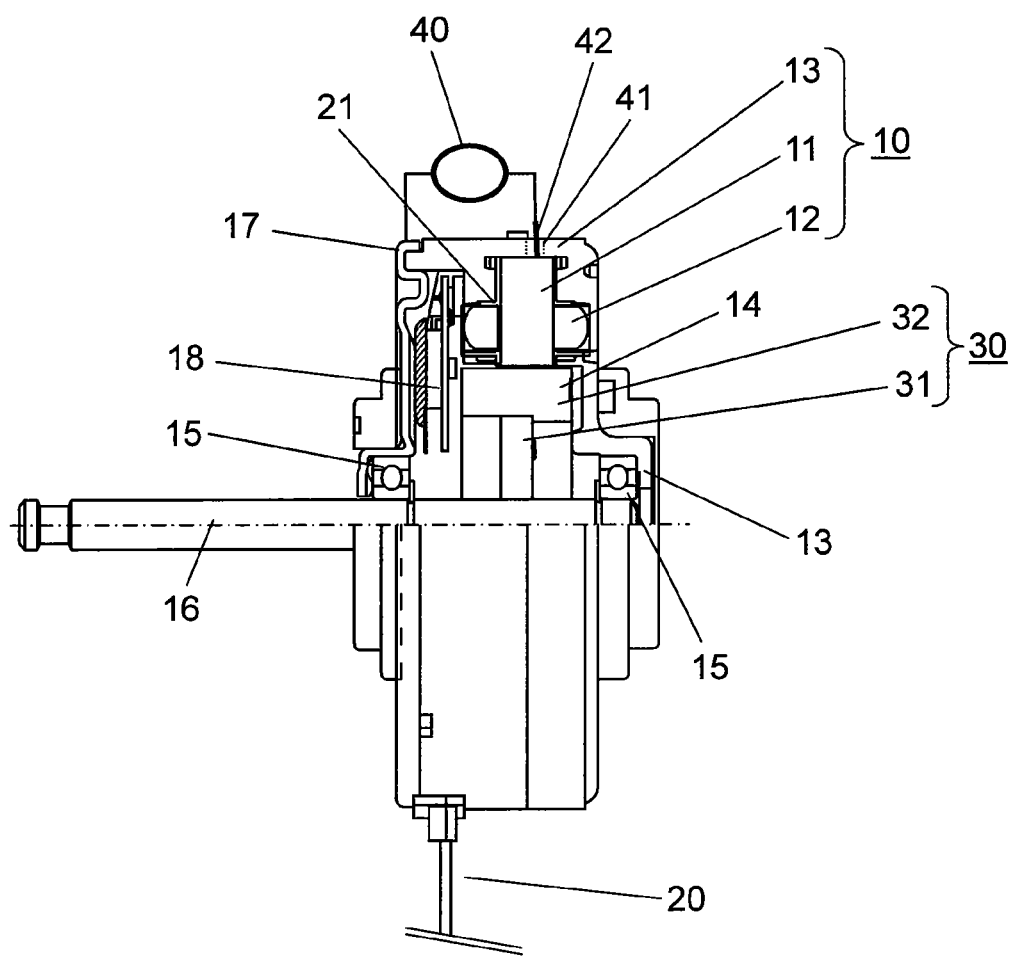
FIG. 1 is a sectional view showing a structure of an electric motor in preferred embodiment 1 of the present invention.

FIG. 1 is a sectional view showing a structure of an electric motor in preferred embodiment 1 of the present invention. This preferred embodiment shows an example of a brushless motor as an electric motor for driving a blowing fan used in an air conditioner as an electric device. This preferred embodiment relates to an example of inner rotor type electric motor in which the rotor is disposed rotatably at the inner circumferential side of the stator.

In FIG. 1, stator iron core 11 having stator winding 12 as a winding is molded and formed by insulating resin (hereinafter called molding material) 13 which is a molding material for molding and forming integrally. As a result, a housing member including stator 10 is composed. Between stator iron core 11 and stator winding 12, resin (hereinafter called insulator) 21 for insulating stator iron core 11 is interposed.

At the inner side of stator 10, rotor 14 is inserted across a gap. Rotor 14 includes rotary member 30 of disk shape having rotor iron core 31, and shaft 16 for tightening rotary member 30 so as to penetrate through the center of rotary member 30. Rotor iron core 31 holds a plurality of permanent magnets in the circumferential direction opposite to the inner circumferential side of stator 10. In the example in FIG. 1, rotor iron core 31 and ferrite resin magnets 32 of permanent magnets are formed integrally. Thus, the inner circumferential side of stator 10 and the outer circumferential side of rotary member 30 are disposed oppositely to each other.

Shaft 16 of rotor 14 is provided with two bearings 15 for supporting shaft 16. Bearings 15 are bearings having a plurality of iron balls. One of the two bearings 15 is fixed on molding material 13 for molding and forming integrally, and the other is fixed on metal bracket 17. That is, the outer ring side of bearing 15 is fixed on molding material 13 and bracket 17, and by way of the iron balls and lubricant of bearing 15, at the inner ring side of bearing 15, shaft 16 is affixed to the inner ring. In this configuration, shaft 16 is supported on two bearings 15, and rotor 14 is free to rotate. Also by this configuration, stator iron core 11 and bracket 17 are insulated by molding material 13. The outer ring side of other bearing 15 is connected to bracket 17 electrically in direct current, and the inner ring side of both bearing 15 is connected to shaft 16 and rotor iron core 31 electrically in direct current. When this electric motor is driven, the inner ring and the outer ring of bearings 15 are insulated from each other by way of lubricant and its oil film.

This brushless motor further incorporates printed circuit board 18 on which a driving circuit is mounted. This printed circuit board 18 has an inverter driving circuit of PWM system. By this inverter driving circuit, stator winding 12 is driven. Incorporating such printed circuit board 18, when bracket 17 is press-fitted to stator 10, a brushless motor is formed. Lead wires for applying supply voltage of the stator winding, and supply voltage and control voltage of the control circuit including grounding cable 20 of the control circuit are connected to printed circuit board 18.

In the present preferred embodiment, between stator iron core 11 and bracket 17, capacitor 40 is connected electrically as a dielectric element. For achieving such connection, specifically, first, a part of molding material 13 positioned at the side of stator iron core 11 is cut off and through-hole 41 is provided, and a part of stator iron core 11 is exposed. Then, by way of through-hole 41, one end of connection pin 42 is connected to an exposed part of stator iron core 11. One end of capacitor 40 is connected to other end of connection pin 42, and other end of capacitor 40 is connected to bracket 17.

In the present preferred embodiment, in order to adjust the impedance between stator winding 12 and the outer ring of bearing 15, as an impedance adjusting member, capacitor 40 is disposed as an element having such impedance component. More specifically, capacitor 40 is interposed between stator iron core 11 and bracket 17 for matching the individual impedances, so that the impedance between stator iron core 11 and the outer ring of bearing 15, and the impedance between stator iron core 11 and the inner ring of bearing 15 may be similar or matched. That is, by interposing capacitor 40 between stator iron core 11 and bracket 17 as a matching member for matching the individual impedances, the impedance between stator iron core 11 and the outer ring of bearing 15 is adjusted. By such adjustments, the individual impedances are approximated or matched.

In the present preferred embodiment, by matching the individual impedances in such manner, when the electric motor is driven, the potentials occurring in the inner ring and the outer ring of bearing 15 due to high frequency currents may be approximated or matched, and the resulting electrolytic corrosion occurring in the bearing can be prevented.

An example of mechanism of occurrence of electrolytic corrosion is explained below.

Figure 2:
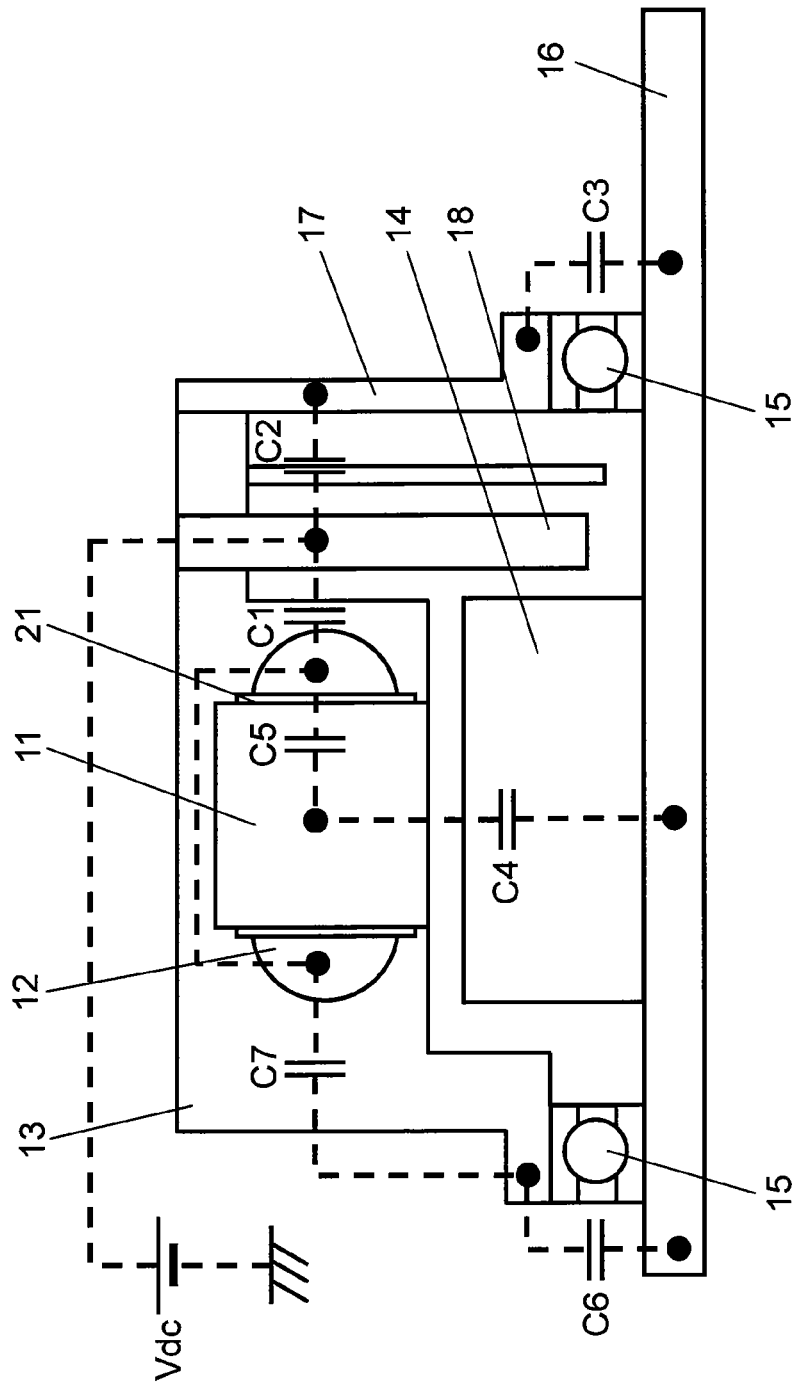
FIG. 2 is a schematic distribution model diagram of electrostatic capacity of a brushless motor.

FIG. 2 is a schematic distribution model diagram of electrostatic capacity of the brushless motor shown in FIG. 1. In FIG. 2, for the ease of understanding of mechanism of occurrence of electrolytic corrosion, capacitor 40 between stator iron core 11 and bracket 17 is omitted.

In FIG. 2, electrostatic capacity C1 is an electrostatic capacity between stator winding 12 and printed circuit board 18. The value of electrostatic capacity C1 mainly depends on the dielectric constant and the insulating distance of insulating resin 13 for molding and forming integrally.

Electrostatic capacity C2 is an electrostatic capacity between printed circuit board 18 and bracket 17. The value of electrostatic capacity C2 mainly depends on the spatial insulating distance.

Electrostatic capacity C3 is an electrostatic capacity between shaft 16 and bracket 17. The value of electrostatic capacity C3 mainly depends on the dielectric constant and the oil film thickness of the lubricant in bearings 15.

Electrostatic capacity C4 is an electrostatic capacity between stator iron core 11 and rotor 14. The value of electrostatic capacity C4 mainly depends on the air gap distance.

Electrostatic capacity C5 is an electrostatic capacity between stator iron core 11 and stator winding 12. The value of electrostatic capacity C5 mainly depends on the dielectric constant and the thickness of resin 21 for insulating the stator iron core.

Electrostatic capacity C6 is an electrostatic capacity between insulating resin 13 of the stator and shaft 16. The value of electrostatic capacity C6, like electrostatic capacity C3, mainly depends on the dielectric constant and the oil film thickness of the lubricant in bearings 15.

Electrostatic capacity C7 is an electrostatic capacity between stator winding 12 and bearings 15. The value of electrostatic capacity C7, like electrostatic capacity C1, mainly depends on the dielectric constant and the insulating distance of insulating resin 13 of the stator. In the diagram, Vdc is a voltage applied to printed circuit board 18.

When the brushless motor having such configuration is driven by the inverter of PWM system, a common mode voltage is generated, and an axial voltage is generated caused by resistance components and electrostatic capacities C1 to C7. In the presence of such axial voltage, in a specific condition, a dielectric breakdown voltage of the oil film in the bearing may be generated, which may lead to an electrolytic corrosion.

When the stator winding 12 is driven by the inverter of PWM system, a loop of circulating current of high frequency is generated through resistance components and electrostatic capacities C1 to C7 between the constituent members. The route of the circulating current starts, for example, from stator iron core 11, runs through stator winding 12, printed circuit board 18, bracket 17, bearings 15, shaft 16, and rotor 14, and returns to stator iron core 11. In this course, when the oil film of the grease of the lubricant in bearings 15 is broken, or the oil film thins out, a local dielectric breakdown occurs, being accompanied by discharge phenomenon. By this discharge phenomenon, tiny discharge scars are formed on the rolling surface of bearings 15, and when this phenomenon continues for long, it may lead to an electrolytic corrosion. The occurrence of discharge phenomenon is closely related to the magnitude of the axial voltage applied on bearings 15 because the common mode voltage is divided by the resistance components and electrostatic capacities C1 to C7.

Figure 3:
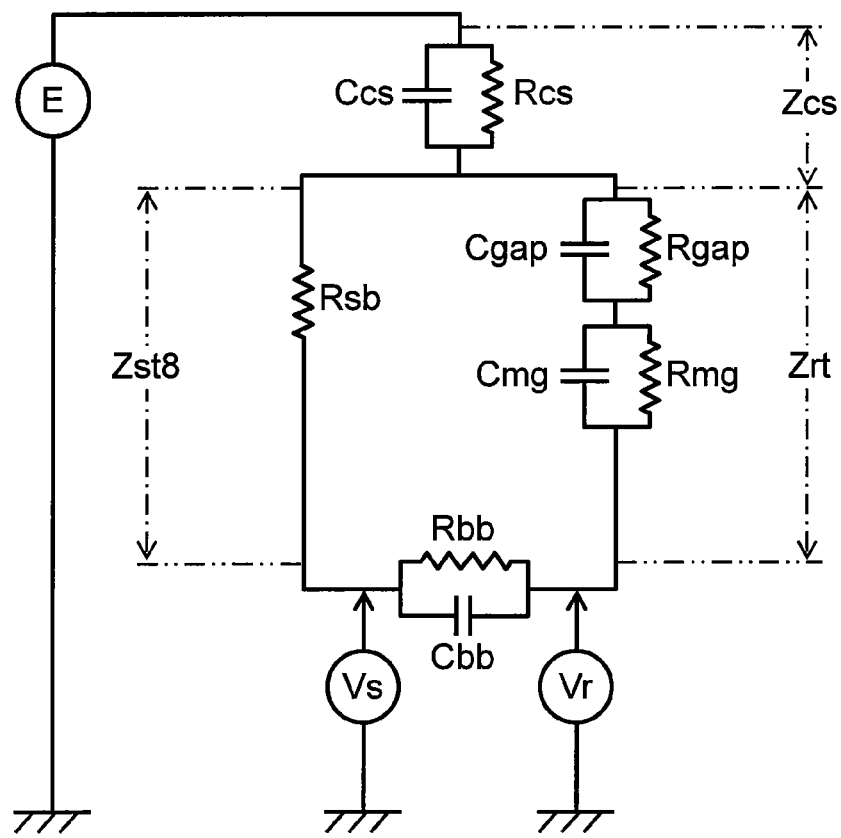
FIG. 3 is an equivalent circuit diagram expressing the relation of constituent elements by equivalent electrostatic capacity and resistance component, for explaining the mechanism of occurrence of electrolytic corrosion.

FIG. 3 is an equivalent circuit diagram expressing the relation of constituent elements by equivalent electrostatic capacity and resistance component, for explaining the mechanism of occurrence of electrolytic corrosion. In FIG. 3, an example is shown in which stator iron core 11 and bracket 17 are short-circuited by short-circuiting member 90.

FIG. 3 also shows an equivalent circuit in which high frequency current flows in two routes by the potential generated in stator winding 12. One route is from stator winding 12 to resin 21 for insulating stator iron core 11 and insulating resin 13 for molding and forming integrally, stator iron core 11, bracket 17, and to the outer ring of bearing 15. The other router is from stator winding 12 to resin 21 and insulating resin 13, stator iron core 11, permanent magnets of rotor 14, rotor iron core, shaft 16, and the inner ring of bearing 15.

These routes are shown in the equivalent circuit in FIG. 3. That is, in FIG. 3, common mode voltage E corresponds to the potential generated in stator winding 12. The equivalent circuit in FIG. 3 includes impedance Zcs between stator winding 12 and stator iron core 11, impedance Zst8 at the stator side, and impedance Zrt at the rotor side.

Impedance Zcs shows impedance in a common route from stator winding 12 to stator iron core 11 by way of resin 21 and insulating resin 13. In FIG. 3, between stator winding 12 and stator iron core 11, electrostatic capacity Ccs and resistance Res are connected in parallel to form an equivalent circuit, of which impedance Zcs is shown.

Impedance Zst8 at the stator side shows impedance from stator iron core 11 to the outer ring of bearing 15 by way of short-circuiting member 90 and bracket 17, corresponding to the first route mentioned above. In FIG. 3, impedance Zst8 by resistance Rsb from stator iron core 11 to the outer ring of bearing 15 is shown.

Impedance Zrt at the rotor side shows an impedance from stator iron core 11 to the inner ring of bearing 15 by way of permanent magnets of rotor 14, rotor iron core, and shaft 16, corresponding to the other route. In FIG. 3, impedance Zrt of equivalent circuit is shown by connecting two parallel circuits in series. One parallel circuit is a circuit of electrostatic capacity Cgap and resistance Rgap in the air gap between stator iron core 11 and rotor 14 connected in parallel. The other parallel circuit is a circuit of electrostatic capacity Cmg and resistance Rmg from the permanent magnets of rotor 14 to the inner ring of bearing 15 connected in parallel.

As shown in FIG. 3, the inner ring and the outer ring of bearing 15 are connected in parallel to electrostatic capacity Cbb and resistance Rbb, and an equivalent circuit is composed. At both ends of this parallel circuit, voltage Vs shows the voltage of the outer ring of bearing 15, and voltage Vr shows the voltage of the inner ring of bearing 15.

Herein, impedance Zrt at the rotor side is
[formula 1]

$$Zrt = Rgap/(1+j\omega CgapRgap) + Rmg/(1+j\omega CmgRmg). \quad (1)$$

Impedance Zrt is determined by the surface area of the stator iron core and permanent magnets of the rotor, the air gap distance between the stator iron core and permanent magnets of the rotor, the material of permanent magnets used in the rotor, and the thickness of permanent magnets up to the rotor iron core.

Impedance Zst8 at the stator side is
[formula 2]

$$Zst8 = Rsb. \quad (2)$$

Herein, at the stator side, since stator iron core 11 and bracket 17 are short-circuited, when formula 1 and formula 2 are compared, impedance Zst8 at the stator side is lower than impedance Zrt at the rotor side. That is, Zrt>Zst8. In other words, voltage Vr of the inner ring of bearing 15 is a low voltage because the impedance of Zrt is higher, and voltage Vs of the outer ring of bearing 15 is a high voltage because the impedance of Zst8 is lower. Therefore, between the inner ring and the outer ring of bearing 15, an axial voltage of voltage value (Vs−Vr) is generated.

By such axial voltage occurring between the inner ring and the outer ring of bearing 15, a discharge phenomenon takes place, and this discharge phenomenon leads to a phenomenon of electrolytic corrosion. When this phenomenon of electrolytic corrosion is repeated, the rolling surface of bearing 15 is roughened, and worn in wavy state, and finally an abnormal sound of the motor is heard. Such discharge phenomenon is more likely to occur when the axial voltage is higher.

Figure 4:
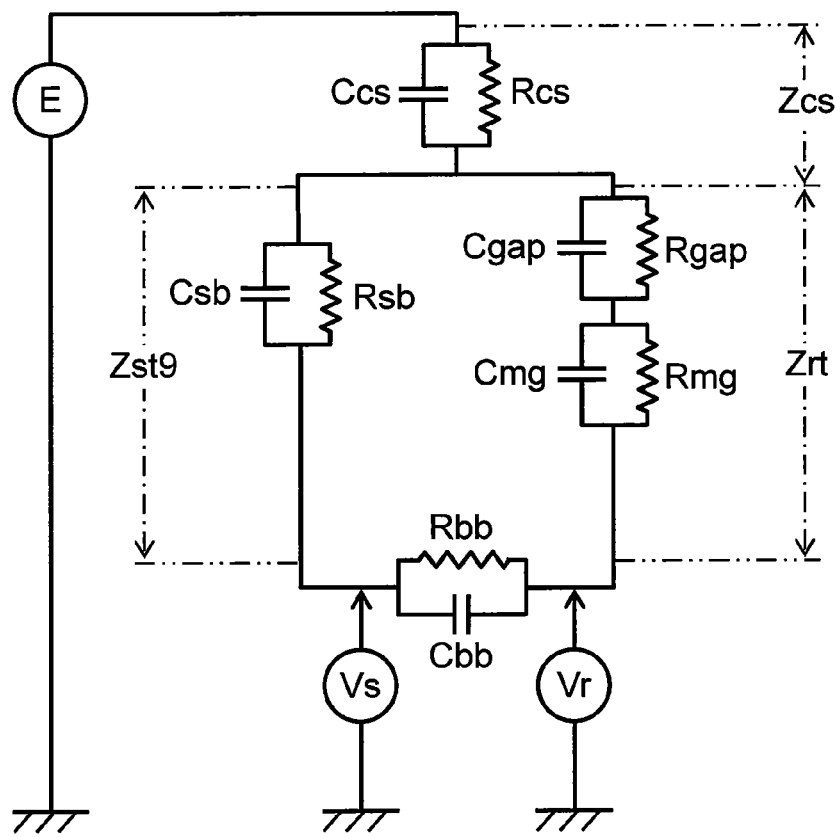
FIG. 4 is an equivalent circuit diagram in consideration of electrostatic capacity of stator side, for explaining the mechanism of occurrence of electrolytic corrosion.

In the above explanation, impedance Zst8 at the stator side is explained only as resistance component Rsb, but actually an electrostatic capacity is also included. That is, in addition to the resistance component, an electrostatic capacity is also present due to molding material 13 between stator iron core 11 and bracket 17 and printed circuit board 18, and the space between printed circuit board 18 and bracket 17. FIG. 4 is an equivalent circuit diagram including the consideration of these electrostatic capacities at the stator side. In FIG. 4, electrostatic capacity Csb and resistance Rsb correspond to these electrostatic capacities and resistance components. In this case, impedance Zst9 at the stator side is
[formula 3]

$$Zst9 = Rsb/(1+j\omega CsbRsb). \quad (3)$$

Considering such electrostatic capacity Csb, impedance Zst9 at the stator side is lower, and voltage Vs of the outer ring of bearing 15 is higher.

As explained herein, the axial voltage occurring due to difference between the impedance from stator iron core 11 to the inner ring of bearing 15 and the impedance to the outer ring is one of the causes of occurrence of electrolytic corrosion.

The following explanation shows the principle of prevention of electrolytic corrosion by the electric motor of the present preferred embodiment having such configuration.

Figure 5:
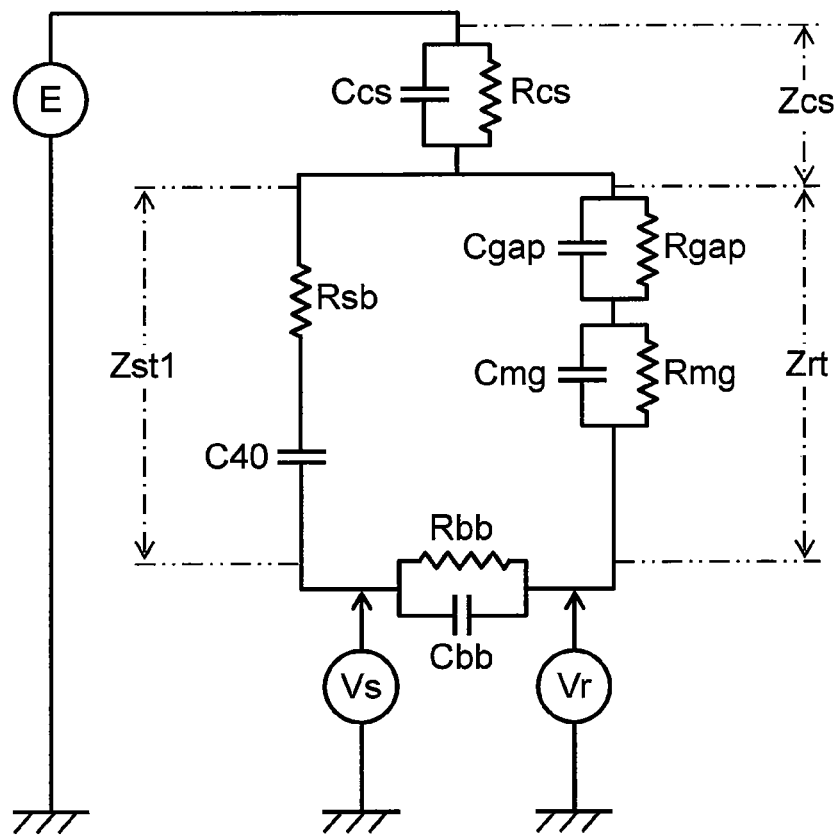
FIG. 5 is an equivalent circuit diagram expressing the relation of constituent elements by equivalent electrostatic capacity and resistance component at the time of driving of the electric motor in preferred embodiment 1 of the present invention.

FIG. 5 is an equivalent circuit diagram expressing the relation of constituent elements by equivalent electrostatic capacity and resistance component at the time of driving of the electric motor in the present preferred embodiment.

FIG. 5 shows an equivalent circuit in which high frequency current flows in two routes by the potential generated in stator winding 12. One route is from stator winding 12 to insulator 21 for insulating stator iron core 11 and molding material 13, stator iron core 11, capacitor 40, bracket 17, and to the outer ring of bearing 15. The other router is from stator winding 12 to insulator 21 and molding material 13, stator iron core 11, permanent magnets of rotor 14, rotor iron core 31, shaft 16, and the inner ring of bearing 15.

These routes are shown in the equivalent circuit in FIG. 5. In FIG. 5, common mode voltage E corresponds to the potential generated in stator winding 12. The equivalent circuit in FIG. 5 includes impedance Zcs between stator winding 12 and stator iron core 11, impedance Zst1 at the stator side, and impedance Zrt at the rotor side.

Impedance Zcs shows impedance in a common route from stator winding 12 to stator iron core 11 by way of insulator 21 and molding material 13. In FIG. 5, between stator winding 12 and stator iron core 11, electrostatic capacity Ccs and resistance Rcs are connected in parallel to form an equivalent circuit, of which impedance Zcs is shown. Since from stator winding 12 to stator iron core 11 are insulated by insulator 21 and molding material 13, electrostatic capacity Ccs is a principal component of impedance Zcs.

Impedance Zst1 at the stator side shows impedance from stator iron core 11 to the outer ring of bearing 15 by way of capacitor 40 and bracket 17, corresponding to the first route mentioned above. In FIG. 5, impedance Zst1 is shown by a series connection of resistance Rsb from stator iron core 11 to the outer ring of bearing 15, and electrostatic capacity C40 of capacitor 40 connected between stator iron core 11 and bracket 17. Impedance Zst1 at the stator side is
[formula 4]

$$Zst1 = (1/j\omega C40) + Rsb. \quad (4)$$

Since resistance Rsb as the resistance component of stator iron core 11 and bracket 17 is relatively low, electrostatic capacity C40 becomes the principal component of impedance Zst1.

Impedance Zrt at the rotor side shows an impedance from stator iron core 11 to the inner ring of bearing 15 by way of by way of permanent magnets of rotor 14, rotor iron core 31, and shaft 16, corresponding to the other route. In FIG. 5, impedance Zrt of equivalent circuit is shown by connecting two parallel circuits in series. One parallel circuit is a circuit of electrostatic capacity Cgap and resistance Rgap in the air gap between stator iron core 11 and rotor 14 connected in parallel. The other parallel circuit is a circuit of electrostatic capacity Crag and resistance Rmg from the permanent magnets of rotor 14 to the inner ring of bearing 15 connected in parallel. Impedance Zrt is shown in formula 1. There is an air gap between stator iron core 11 and rotor 14, and a metal connected structure is present from permanent magnets to the inner ring of bearing 15, and therefore electrostatic capacity Cgap and resistance Rmg are principal components of impedance Zrt.

As shown in FIG. 5, the inner ring and the outer ring of bearing 15 are connected in parallel to electrostatic capacity Cbb and resistance Rbb, and an equivalent circuit is composed. At both ends of this parallel circuit, voltage Vs shows the voltage of the outer ring of bearing 15, and voltage Vr shows the voltage of the inner ring of bearing 15.

Herein, as mentioned above, when stator iron core 11 and bracket 17 are short-circuited, the impedance at the stator side is lower than the impedance at the rotor side. By contrast, in the present preferred embodiment, capacitor 40 is connected between stator iron core 11 and bracket 17. In this configuration, impedance Zst1 at the stator side is as shown in formula 4, and as compared with the case in which when stator iron core 11 and bracket 17 are short-circuited, the impedance is higher. That is, by adjusting electrostatic capacity C40 of capacitor 40 and setting the capacity value appropriately, impedance Zst1 at the stator side may be set similar to or same as impedance Zrt at the rotor side, and the individual impedances may be matched. Further, by approximating or matching impedance Zst1 at the stator side and impedance Zrt at the rotor side, voltage Vs of the outer ring of bearing 15 and voltage Vr of the inner ring may be approximated or matched. Therefore, the potential difference occurring between the inner ring and the outer ring of bearing 15, that is, the axial voltage of voltage value (Vs−Vr) may be suppressed to be low. As a result, the axial voltage is prevented from rising up to the dielectric breakdown voltage of the oil film inside the bearing, and electrolytic corrosion occurring in the bearing may be prevented.

Herein, to enhance the impedance at the stator side, capacitor 40 is connected as a dielectric element between stator iron core 11 and bracket 17, but not limited to this example, other structure may be also employed.

Figure 6:
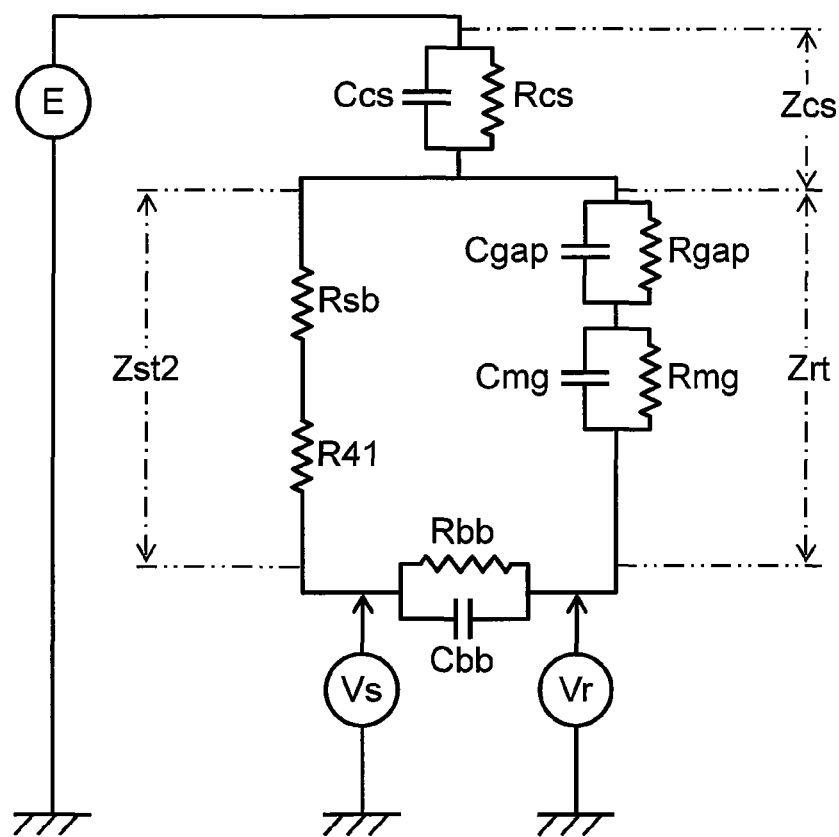
FIG. 6 is an equivalent circuit diagram when a resistive element is connected between a stator iron core and a bracket in preferred embodiment 1 of the present invention.

In a modified example of the present preferred embodiment, a resistive element may be connected between stator iron core 11 and bracket 17. FIG. 6 is an equivalent circuit diagram when a resistive element is connected between stator iron core 11 and bracket 17. As shown in FIG. 6, instead of electrostatic capacity C40 in FIG. 5, resistance R41 is connected in series to resistance Rsb. In a specific configuration example, instead of capacitor 40 in FIG. 1, a resistor may be connected. At this time, impedance Zst2 at the stator side is

[formula 5]

$$Zst2 = R41 + Rsb. \quad (5)$$

That is, same as when capacitor 40 is connected between stator iron core 11 and bracket 17, by adjusting resistance R41 and setting its resistance value appropriately, impedance Zst2 at the stator side can be matched with impedance Zrt at the rotor side. As a result, voltage Vs of the outer ring of bearing 15 and voltage Vr of the inner ring can be approximated or matched, and the axial voltage between the inner ring and the outer ring of bearing 15 can be suppressed to be low.

In the explanation above, between stator iron core 11 and bracket 17, a dielectric element or a resistive element is connected, but a dielectric element and a resistive element may be connected in parallel or connected in series, and they may be connected between stator iron core 11 and bracket 17. Not limited to the connecting configuration in which the components such as dielectric element and resistive element between stator iron core 11 and bracket 17, for example, a resin having a specified dielectric constant, or a resistor having a specified resistance value, or other member may be provided between stator iron core 11 and bracket 17.

Exemplary embodiments of this preferred embodiment are specifically described below.

First Exemplary Embodiment

Using the brushless motor shown in FIG. 1, dielectric elements of 10 pF, 47 pF, 100 pF, 330 pF, and 560 pF were connected in series between bracket 17 and connection pin 42 as capacitors 40, and the axial voltage and the axial current were measured. As the dielectric elements, plastic film capacitors of radial lead type were used.

The electrostatic capacity and the impedance of individual components were measured by using Agilent Technology's LCR meter 4263A, at measuring voltage of 1 V and measuring frequency of 10 kHz.

Figure 7:
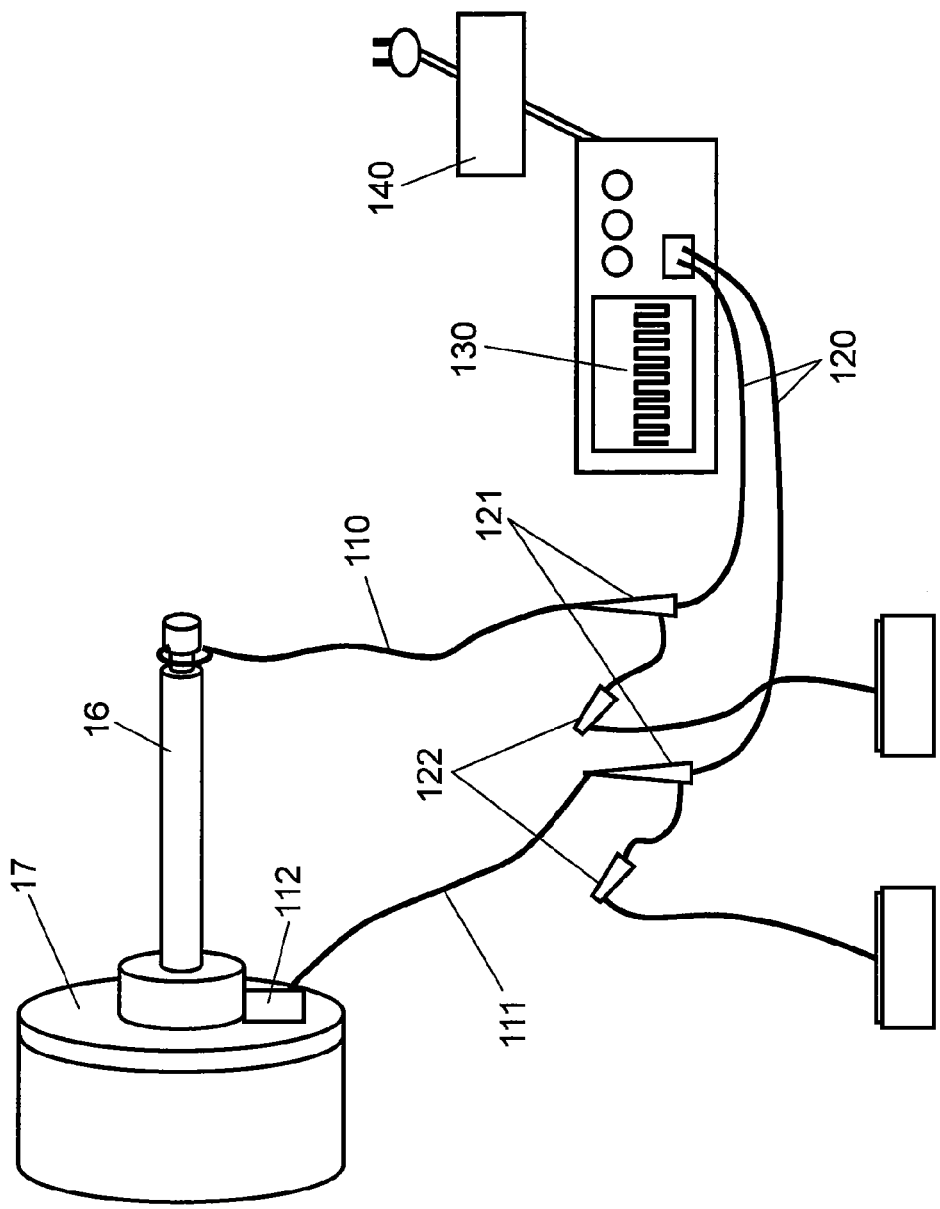
FIG. 7 is a diagram showing a measuring method of axial voltage in the electric motor in preferred embodiment 1 of the present invention.

FIG. 7 shows the measuring method of axial voltage. The axial voltage was measured by using a direct-current stabilized power source, in the same operating conditions of winding supply voltage Vdc of 391 V, control circuit supply voltage Vcc of 15 V, rotating speed control voltage Vsp of 3 V, and rotating speed of 1000 rpm. In operation, the brushless motor position was in shaft horizontal position.

Figure 8:
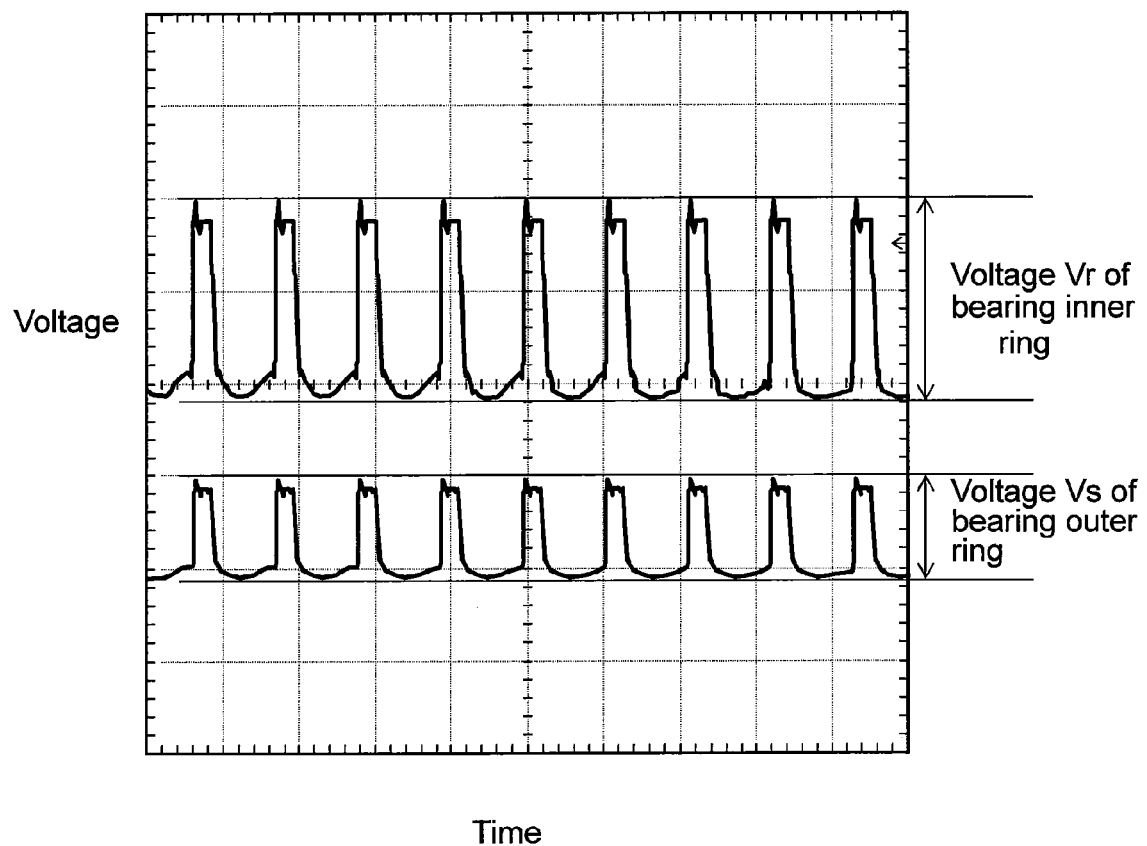
FIG. 8 is a diagram showing a voltage waveform of axial voltage in the electric motor in preferred embodiment 1 of the present invention.

Outer ring voltage Vs and inner ring voltage Vr of the bearing were measured by observing the voltage waveforms as shown in FIG. 8, by using digital oscilloscope 130 (Tektronix TDS640A), and the crest values were obtained as the individual voltages. The time on the axis of abscissas was fixed at 50 μs/div during measurement. Digital oscilloscope 130 was insulated by insulating transformer 140.

To measure outer ring voltage Vs of the bearing, lead wire 111 was connected to bracket 17 near the outer ring by means of conductive tape 112, and leading end 121 of probe 120 was connected to this lead wire 111, and the voltage was measured. At this time, ground 122 of probe 120 is connected to the ground of the power source. To measure inner ring voltage Vr, at one end of lead wire 110, the conductor is formed in a loop of about 8 mm in diameter, and the inner circumference of the loop is conductively contacted with the outer circumference of shaft 16 near the inner ring, and leading end 121 of probe 120 is connected to the other end of lead wire 110, and the voltage is measured. At this time, ground 122 of probe 120 is connected to the ground of the power source.

Figure 9:
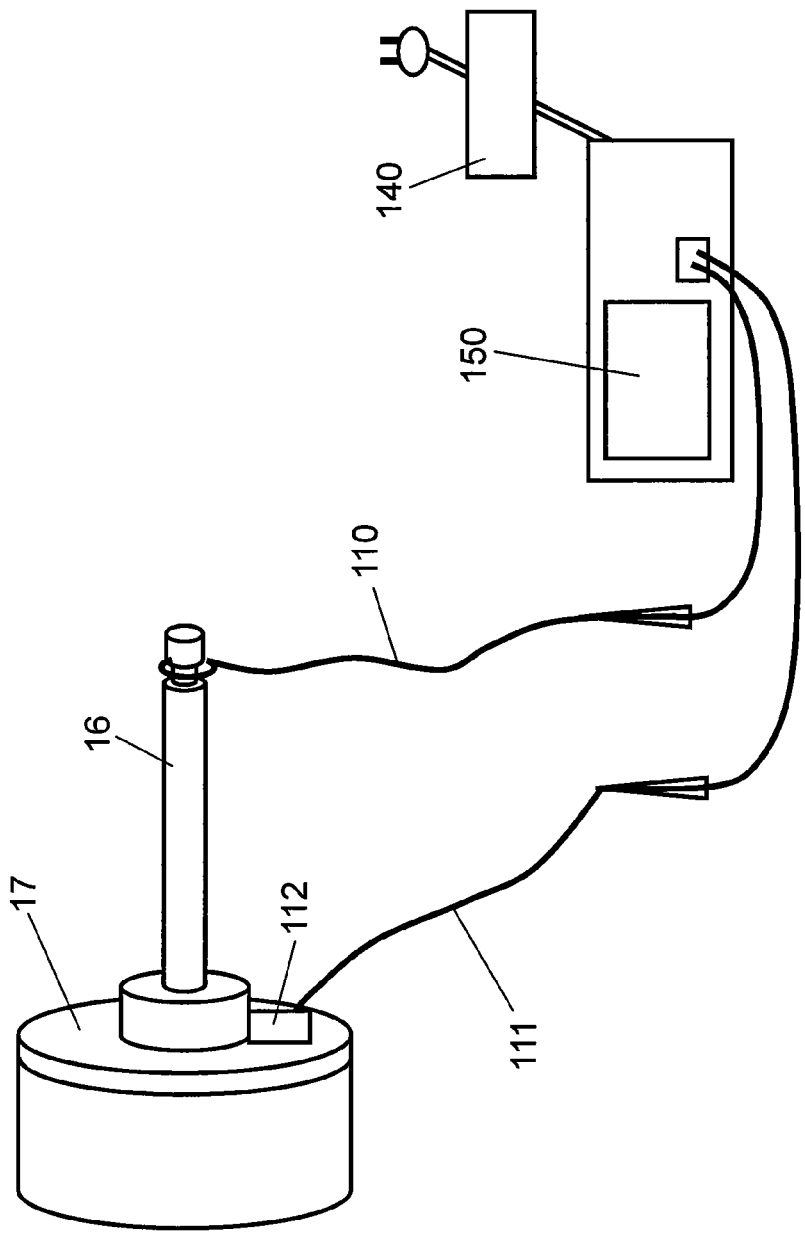
FIG. 9 is a diagram showing a measuring method of axial current in the electric motor in preferred embodiment 1 of the present invention.

FIG. 9 shows the measuring method of axial current. To measure the axial current, too, the operating conditions and the motor position were same as when measuring the axial voltage. To measure the current value, Hioki Denki's 3156 leak current high tester 150 was used. As the current value, the AC current value was measured in external-external leak current measuring mode.

Throughout this measurement, in order to keep the outer ring and the inner ring of the bearing always in insulated state, bearings of ceramic ball specification were used. In the ordinary iron ball specification, the outer ring and the inner ring of the bearing may sometimes conduct or not, and accurate measurement is not expected.

COMPARATIVE EXAMPLE 1

Without connecting capacitor 40, and without short-circuiting bracket 17 and stator iron core 11, the axial voltage and the axial current were measured same as in the first exemplary embodiment.

COMPARATIVE EXAMPLE 2

Without connecting capacitor 40, and by short-circuiting bracket 17 and stator iron core 11, the axial voltage and the axial current were measured same as in the first exemplary embodiment.

The measuring results of the first exemplary embodiment, comparative example 1 and comparative example 2 are shown in Table 1.

TABLE 1

|  |  | Comparative example 1 | First exemplary embodiment | | | | | Comparative example 2 |
| --- | --- | --- | --- | --- | --- | --- | --- | --- |
| Dielectric element connected between stator iron core and bracket |  | Not short-circuited | 10 pF | 47 pF | 100 pF | 330 pF | 560 pF | Short-circuited |
| Electrostatic capacity between stator iron core and bracket (bearing outer ring) | pF | 32 | 42 | 79 | 130 | 369 | 566 | Conducting |
| Electrostatic capacity between stator iron core and shaft (bearing inner ring) | pF | 85 | 86 | 88 | 88 | 90 | 90 | 90 |
| Impedance $Z_{ST}$ between stator iron core and bracket (bearing outer ring) | kΩ | 486 | 370 | 200 | 122 | 43 | 28 | 0.07 (Conducting) |
| Impedance $Z_{RT}$ between stator iron core and shaft (bearing inner ring) | kΩ | 186 | 184 | 180 | 179 | 177 | 176 | 176 |
| Rate of $Z_{ST}$ on $Z_{RT}$ reference | % | 161 | 101 | 11 | −32 | −76 | −84 | −100 |
| Voltage Vs of bearing outer ring | V | 116 | 148 | 192 | 220 | 260 | 274 | 280 |
| Voltage Vr of bearing inner ring | V | 228 | 236 | 236 | 236 | 240 | 244 | 252 |
| Axial voltage Vs − Vr or Vr − Vs | V | 112 | 88 | 44 | 16 | 20 | 30 | 28 |
| Axial current | μA | 416 | 401 | 345 | 313 | 476 | 1107 | 1397 |

As clear from Table 1, by connecting a plastic film capacitor in series between stator iron core 11 and bracket 17, the impedance between stator iron core 11 and bracket 17 (bearing outer ring) can be approximated to the impedance between stator iron core 11 and shaft 16 (bearing inner ring). Also as shown in Table 1, the axial current may be similarly decreased. In particular, on the basis of impedance between stator iron core 11 and the bearing inner ring, as compared with this reference, as far as the impedance between stator iron core 11 and the bearing outer ring is within a range of plus 10% to minus 75% of the reference, the axial voltage or axial current may be set smaller than in comparative example 1 and comparative example 2.

Second Exemplary Embodiment

Using the brushless motor of the same specification as in the first exemplary embodiment, resistive elements of 470 kΩ, 220 kΩ, 170 kΩ, 100 kΩ, and 56 kΩ were connected in series between bracket 17 and connection pin 42, and the axial voltage and the axial current were measured in the same method as in the first exemplary embodiment. As the resistive elements, carbon film fixed resistors of lead type were used.

The measuring results of the second exemplary embodiment, comparative example 1 and comparative example 2 are shown in Table 2.

TABLE 2

|  |  | Comparative example 1 | Second exemplary embodiment | | | | | Comparative example 2 |
| --- | --- | --- | --- | --- | --- | --- | --- | --- |
| Resistive element connected between stator iron core and bracket |  | Not short-circuited | 470 kΩ | 220 kΩ | 170 kΩ | 100 kΩ | 56 kΩ | Short-circuited |
| Impedance $Z_{ST}$ between stator iron core and bracket (bearing outer ring) | kΩ | 486 | 462 | 203 | 166 | 97 | 55 | (Conducting) 0.07 |
| Impedance $Z_{RT}$ between stator iron core and shaft (bearing inner ring) | kΩ | 186 | 181 | 178 | 177 | 177 | 176 | 176 |
| Rate of $Z_{ST}$ on $Z_{RT}$ reference | % | 161 | 155 | 14 | −6 | −45 | −69 | −100 |
| Voltage Vs of bearing outer ring | V | 116 | 130 | 196 | 208 | 228 | 236 | 280 |
| Voltage Vr of bearing inner ring | V | 228 | 236 | 236 | 232 | 236 | 232 | 252 |
| Axial voltage Vs − Vr or Vr − Vs | V | 112 | 106 | 40 | 24 | 8 | 4 | 28 |
| Axial current | μA | 416 | 416 | 341 | 360 | 388 | 409 | 1397 |

As clear from Table 2, by connecting a carbon film fixed resistor in series between stator iron core 11 and bracket 17, the impedance between stator iron core 11 and bracket 17 (bearing outer ring) can be approximated to the impedance between stator iron core 11 and shaft 16 (bearing inner ring). Also as shown in Table 2, the axial current may be similarly decreased. In particular, on the basis of impedance between stator iron core 11 and the bearing inner ring, as compared with this reference, as far as the impedance between stator iron core 11 and the bearing outer ring is within a range of plus 10% to minus 65% of the reference, the axial voltage or axial current may be set smaller than in comparative example 1 and comparative example 2.

Preferred Embodiment 2

Figure 10:
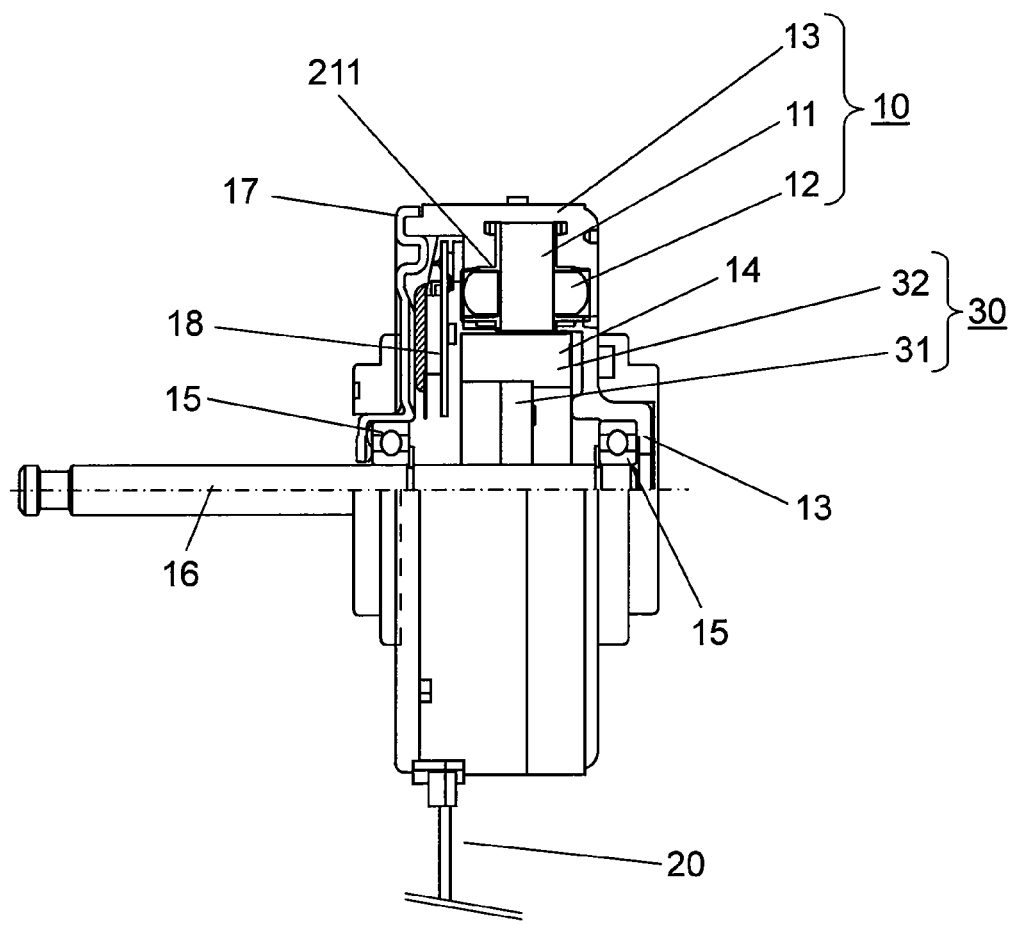
FIG. 10 is a sectional view showing a structure of an electric motor in preferred embodiment 2 of the present invention.

FIG. 10 is a sectional view showing a structure of an electric motor in preferred embodiment 2 of the present invention. In comparison with preferred embodiment 1, in this preferred embodiment, capacitor 40, through-hole 41, and connection pin 42 are not provided. Further, in this preferred embodiment, the insulator as the resin for insulating stator iron core 11 is insulator 211 of which dielectric constant is 3.0 or less. In FIG. 10, same components as in FIG. 1 are identified with same reference numerals, and the detailed description is omitted.

In this preferred embodiment, in order to adjust the impedance between stator winding 12 and the outer ring of bearing 15, insulator 211 having a dielectric constant of 3.0 or less is used as impedance adjusting member, being disposed between stator iron core 11 and stator winding 12. In this preferred embodiment, by lowering the dielectric constant of the insulator, when this electric motor is driven, the potential occurring between the inner ring and the outer ring of bearing 15 due to high frequency currents is lowered, thereby preventing electrolytic corrosion occurring inside the bearing.

The following explanation shows the principle of prevention of electrolytic corrosion by the electric motor of the present preferred embodiment having such configuration.

For example, as shown in the equivalent circuit diagram in FIG. 5, since common mode voltage E is applied by way of the insulator, electrostatic capacity Ccs and resistance Rcs corresponding to the insulator have effects on inner ring voltage Vr and outer ring voltage Vs of bearing 15 respectively. Impedance Zcs between stator winding 12 and stator iron core 11 is

[formula 6]

$$Zcs = Rcs/(1+j\omega CcsRcs). \quad (6)$$

Generally, the dielectric constant of an insulator used in an electric motor is about 3.2 to 4.0 in the frequency measuring condition of 1 MHz. By contrast, in this preferred embodiment, a material of low dielectric constant of 3.0 or less is selected for insulator 211. That is, by such selection, electrostatic capacity Ccs of the insulator for insulating stator iron core 11 is reduced, and hence impedance Zcs of the insulator is higher. Herein, impedance Zcs of the insulator is connected in series to the impedance at the stator side and the impedance at the rotor side. Therefore, when impedance Zcs of the insulator is higher, the distributed voltage in the insulator is higher. As a result, inner ring voltage Vr and outer ring voltage Vs of bearing 15 become lower. In other words, by using insulator 211 of higher impedance, voltage Vr and voltage Vs can be lowered, and hence the axial voltage due to potential difference of voltage Vr and voltage Vs can be also lowered. Accordingly, the axial voltage is suppressed from reaching up to the dielectric breakdown voltage of the oil film in the bearing, so that electrolytic corrosion occurring in the bearing may be prevented.

In the explanation above, insulator 211 of low dielectric constant is used, but actually impedance Zcs between stator winding 12 and stator iron core 11 is also influenced by molding material 13 used as insulating resin. That is, since common mode voltage E is applied through insulator 211 and molding material 13, the electrostatic capacity and the resistance component by molding material 13 has effects on inner ring voltage Vr and outer ring voltage Vs of bearing 15. Accordingly, as the impedance adjusting member, a material of low dielectric constant of 3.0 or less may be selected as molding material 13. Also, as the impedance adjusting member, an insulator of dielectric constant of 3.0 or less, and a molding material of dielectric constant of 3.0 or less may be selected.

This preferred embodiment is more specifically described below by presenting another exemplary embodiment.

Third Exemplary Embodiment

Using the brushless motor of the same specification as in the first exemplary embodiment, only the material for insulator 211 is changed to one of dielectric constant of 2.8, bracket 17 and stator iron core 11 were short-circuited, and the axial voltage and the axial current were measured in the same method as in the first exemplary embodiment. The material for insulator 211 was syndiotactic polystyrene (SPS) resin (XAREC S120) of Idemitsu Petrochemical Corporation.

The insulator material in comparative example 2 is a forming material of general polyethylene terephthalate (PET) used conventionally having a dielectric constant of 3.6.

COMPARATIVE EXAMPLE 3

Using the brushless motor of the same specification as in the first exemplary embodiment, only the material for insulator 211 is changed to one of dielectric constant of 5.8, bracket 17 and stator iron core 11 were short-circuited, and the axial voltage and the axial current were measured in the same method as in the first exemplary embodiment. The material for insulator 211 was polybutylene terephthalate (PBT) resin (Duranex 6302T) of WinTech Polymer.

The measuring results of the third exemplary embodiment, comparative example 2 and comparative example 3 are shown in Table 3.

TABLE 3

|  |  | Third exemplary embodiment | Comparative example 2 | Comparative example 3 |
|---|---|---|---|---|
| Insulator dielectric constant |  | 2.8 | 3.6 | 5.8 |
| Molding material dielectric constant |  | 3.9 | 3.9 | 3.9 |
| Measuring state |  | Short-circuited | Short-circuited | Short-circuited |
| Electrostatic capacity $C_{CS}$ between stator winding and stator iron core | pF | 218 | 381 | 464 |

TABLE 3-continued

|  |  | Third exemplary embodiment | Comparative example 2 | Comparative example 3 |
|---|---|---|---|---|
| Change rate of electrostatic capacity to comparative example 2 reference | % | −43 | — | 22 |
| Electrostatic capacity between stator iron core and bracket (bearing outer ring) | pF | Conducting | Conducting | Conducting |
| Electrostatic capacity between stator iron core and shaft (bearing inner ring) | pF | 92 | 90 | 88 |
| Impedance $Z_{CS}$ between stator winding and stator iron core | kΩ | 72 | 43 | 38 |
| Change rate of impedance to comparative example 2 reference | % | 67 | — | −12 |
| Impedance $Z_{ST}$ between stator iron core and bracket (bearing outer ring) | kΩ | Conducting (0.07) | Conducting (0.07) | Conducting (0.07) |
| Impedance $Z_{RT}$ between stator iron core and shaft (bearing inner ring) | kΩ | 171 | 176 | 171 |
| Rate of $Z_{ST}$ on $Z_{RT}$ reference | % | −100 | −100 | −100 |
| Voltage Vs of bearing outer ring | V | 260 | 280 | 312 |
| Voltage Vr of bearing inner ring | V | 244 | 252 | 272 |
| Axial voltage Vs − Vr or Vr − Vs | V | 16 | 28 | 40 |
| Axial current | μA | 1250 | 1397 | 1438 |

As clear from Table 3, by using a low dielectric constant material of 3.0 or less as insulator 211, the electrostatic capacity between stator winding 12 and stator iron core 11 is lowered, and the impedance between stator winding 12 and stator iron core 11 can be heightened. Further, outer ring voltage Vs and inner ring voltage Vr of the bearing can be both lowered, and hence the axial voltage can be decreased. The axial current can be also decreased along with lowering of the axial voltage.

Fourth Exemplary Embodiment

Using the brushless motor of the same specification as in the first exemplary embodiment, only the material for molding material 13 is changed to one of dielectric constant of 2.1, bracket 17 and stator iron core 11 were short-circuited, and the axial voltage and the axial current were measured in the same method as in the first exemplary embodiment. The material for molding material 13 was unsaturated polyester (UP) resin, filled with glass balloon, and lowered in the dielectric constant.

Molding material 13 in comparative example 2 is a forming material of unsaturated polyester (UP) resin filled with general glass fiber or calcium carbonate used conventionally having a dielectric constant of 3.9.

COMPARATIVE EXAMPLE 4

Using the brushless motor of the same specification as in the first exemplary embodiment, only the material for molding material 13 is changed to one of dielectric constant of 5.7, bracket 17 and stator iron core 11 were short-circuited, and the axial voltage and the axial current were measured in the same method as in the first exemplary embodiment. The material for molding material 13 was unsaturated polyester (UP) resin filled with titanium oxide, and advanced in dielectric constant.

The dielectric constant of the resin material was measured according to JIS K 6911, in the condition of 23° C., 50% RH, and 1 MHz.

The measuring results of the fourth exemplary embodiment, comparative example 2 and comparative example 4 are shown in Table 4.

TABLE 4

|  |  | Fourth exemplary embodiment | Comparative example 2 | Comparative example 4 |
|---|---|---|---|---|
| Molding material dielectric constant |  | 2.1 | 3.9 | 5.7 |
| Insulator dielectric constant |  | 3.6 | 3.6 | 3.6 |
| Measuring state |  | Short-circuited | Short-circuited | Short-circuited |
| Electrostatic capacity $C_{CS}$ between stator winding and stator iron core | pF | 230 | 381 | 440 |
| Change rate of electrostatic capacity to comparative example 2 reference | % | −40 | — | 15 |
| Electrostatic capacity between stator iron core and bracket (bearing outer ring) | pF | Conducting | Conducting | Conducting |
| Electrostatic capacity between stator iron core and shaft (bearing inner ring) | pF | 91 | 90 | 89 |
| Impedance $Z_{CS}$ between stator winding and stator iron core | kΩ | 68 | 43 | 39 |
| Change rate of impedance to comparative example 2 reference | % | 58 | — | −9 |
| Impedance $Z_{ST}$ between stator iron core and bracket (bearing outer ring) | kΩ | Conducting (0.07) | Conducting (0.07) | Conducting (0.07) |
| Impedance $Z_{RT}$ between stator iron core and shaft (bearing inner ring) | kΩ | 173 | 176 | 173 |

TABLE 4-continued

|  |  | Fourth exemplary embodiment | Comparative example 2 | Comparative example 4 |
|---|---|---|---|---|
| Rate of $Z_{ST}$ on $Z_{RT}$ reference | % | −100 | −100 | −100 |
| Voltage Vs of bearing outer ring | V | 261 | 280 | 310 |
| Voltage Vr of bearing inner ring | V | 245 | 252 | 274 |
| Axial voltage Vs − Vr or Vr − Vs | V | 16 | 28 | 36 |
| Axial current | μA | 1320 | 1397 | 1422 |

As clear from Table 4, by using a low dielectric constant material of 3.0 or less as molding material 13, the electrostatic capacity between stator winding 12 and stator iron core 11 is lowered, and the impedance between stator winding 12 and stator iron core 11 can be heightened. Further, outer ring voltage Vs and inner ring voltage Vr of the bearing can be both lowered, and hence the axial voltage can be decreased. The axial current can be also decreased along with lowering of the axial voltage.

Preferred Embodiment 3

Figure 11:
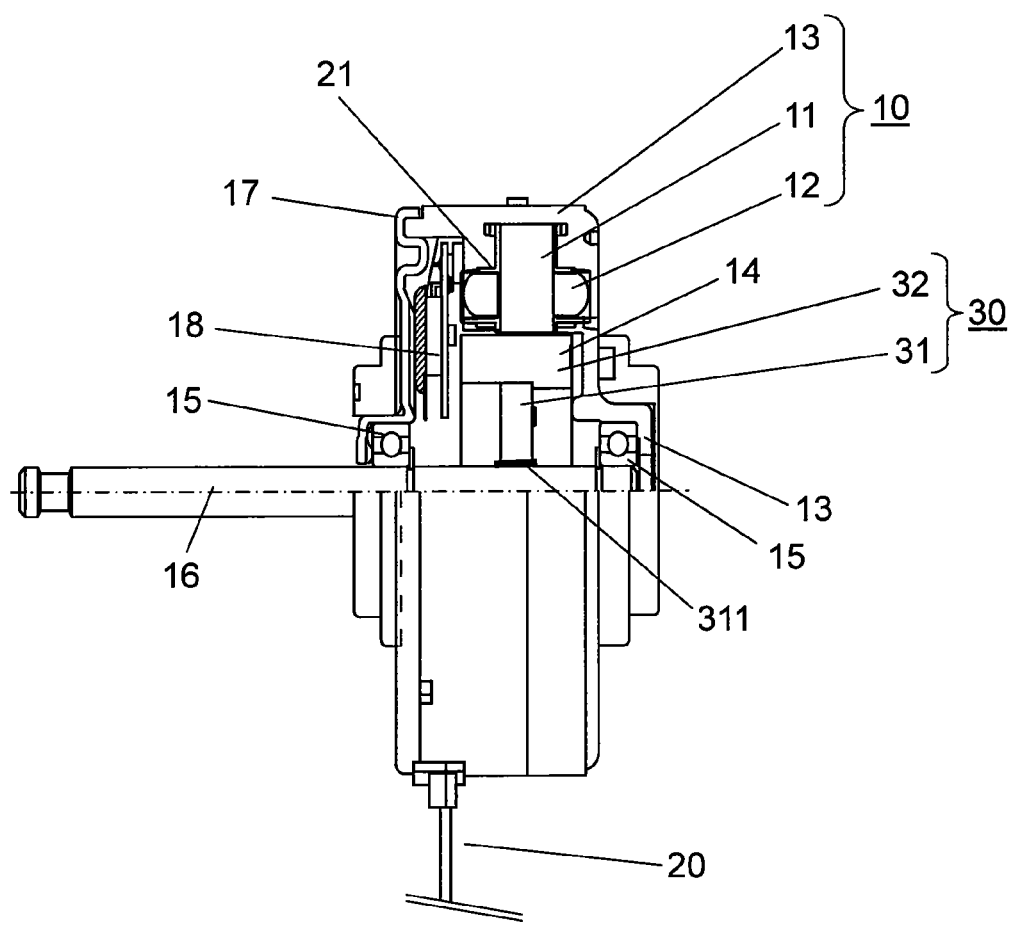
FIG. 11 is a sectional view showing a structure of an electric motor in preferred embodiment 3 of the present invention.

FIG. 11 is a sectional view showing a structure of an electric motor in preferred embodiment 3 of the present invention. In comparison with preferred embodiment 1, in this preferred embodiment, capacitor 40, through-hole 41, and connection pin 42 are not provided. Further, in this preferred embodiment, insulating resin 311 containing an impedance component is interposed between rotor iron core 31 and shaft 16. In preferred embodiment 1, the impedance between stator winding 12 and the outer ring of bearing 15 is adjusted, but in this preferred embodiment, insulating resin 311 is interposed, and the impedance between stator winding 12 and the inner ring of bearing 15 is adjusted. In FIG. 11, same components as in FIG. 1 are identified with same reference numerals, and the detailed description is omitted.

In this preferred embodiment, in order to adjust the impedance between stator winding 12 and the inner ring of bearing 15, insulating resin 311 containing an impedance component is interposed between rotor iron core 31 and shaft 16. More specifically, in order to match the individual impedances so that the impedance between stator iron core 11 and the inner ring of bearing 15 may be close to the impedance between stator iron core 11 and the outer ring of bearing 15, insulating resin 311 for insulating and isolating them is interposed between rotor iron core 31 and shaft 16. By interposing such insulating resin 311 as a matching member, the impedance between stator iron core 11 and the inner ring of bearing 15 is adjusted.

The following explanation shows the principle of prevention of electrolytic corrosion by the electric motor of the present preferred embodiment having such configuration.

Figure 12:
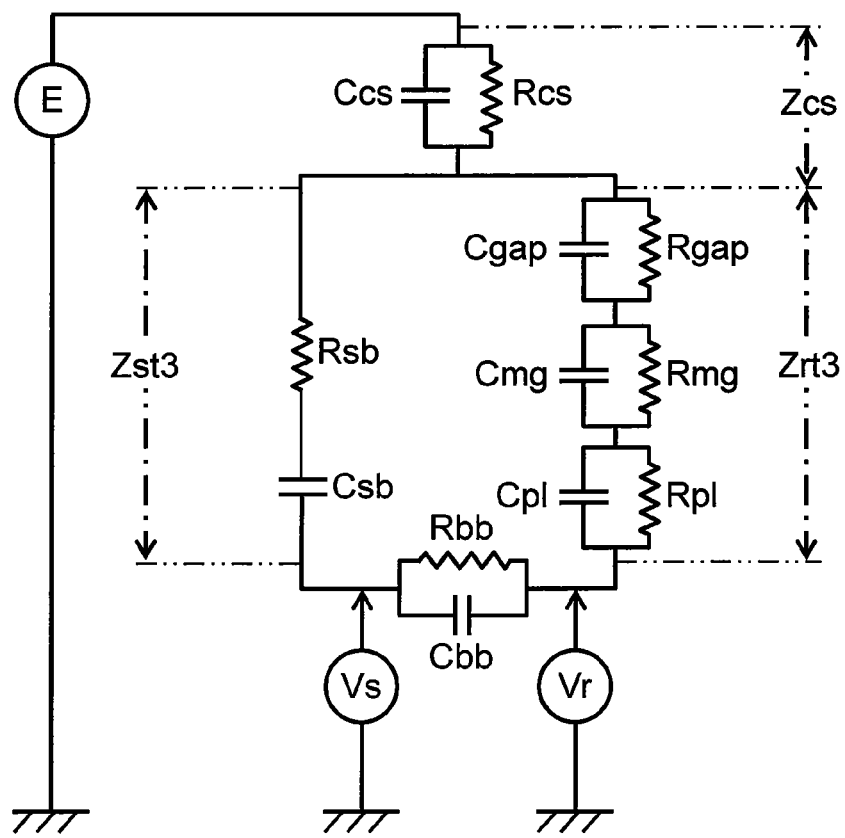
FIG. 12 is an equivalent circuit diagram expressing the relation of constituent elements by equivalent electrostatic capacity and resistance component at the time of driving of the electric motor in preferred embodiment 3 of the present invention.

FIG. 12 is an equivalent circuit diagram expressing the relation of constituent elements by equivalent electrostatic capacity and resistance component at the time of driving of this electric motor.

In FIG. 12, impedance Zst3 at the stator side shows impedance from stator iron core 11 to the outer ring of bearing 15 by way of bracket 17. In FIG. 12, impedance Zst3 is shown as a result of series connection by resistance Rsb from stator iron core 11 to the outer ring of bearing 15, and electrostatic capacity Csb between stator iron core 11 and bracket 17. That is, since stator iron core 11 and bracket 17 are not connected electrically, impedance Zst3 is higher as compared with impedance Zst8 shown in FIG. 3.

Impedance Zrt3 at the rotor side shows impedance from stator iron core 11 to the inner ring of bearing 15 by way of permanent magnets of rotor 14, rotor iron core 31, insulating resin 311 as an impedance adjusting member, and shaft 16. As shown in FIG. 12, for example, as compared with impedance Zrt at the rotor side shown in FIG. 5, impedance Zrt3 further includes electrostatic capacity Cp1 and resistance Rp1 corresponding to insulating resin 311. Impedance Zrt3 is

[formula 7]

$$Zrt3 = Rgap/(1+j\omega CgapRgap) + Rmg/(1+j\omega CmgRmg) + Rp1/(1+j\omega Cp1Rp1). \quad (7)$$

That is, as compared with the case not provided with insulating resin 311, the impedance at the rotor side can be heightened.

Therefore, when stator iron core 11 and bracket 17 are not short-circuited, impedance Zst3 at the stator side is higher. In the present preferred embodiment, hence, by interposing insulating resin 311 between rotor iron core 31 and shaft 16, impedance Zrt3 at the rotor side is also heightened so that the individual impedances are approximated or matched. In other words, the electrostatic capacity is adjusted by insulating resin 311 interposed between rotor iron core 31 and shaft 16, and by setting the capacity value appropriately, impedance Zrt3 at the rotor side is set closer to or same as impedance Zst3 at the stator side. Further by approximating or matching impedance Zrt3 at the rotor side and impedance Zst3 at the rotor side, outer ring voltage Vs and inner ring voltage Vr of bearing 15 are approximated or matched. Accordingly, the axial voltage occurring between the inner ring and the outer ring of bearing 15 can be suppressed to be low. As a result, the axial voltage is prevented from reaching up to the dielectric breakdown voltage of the oil film inside the bearing, and electrolytic corrosion occurring in the bearing can be prevented.

This preferred embodiment is more specifically described below by showing an exemplary embodiment.

Fifth Exemplary Embodiment

In the brushless motor of the same stator specification as in the first exemplary embodiment, the rotor was composed by forming shaft 16 and rotor iron core 31 of inside diameter larger by 2 mm than the shaft outside diameter integrally, and integrating an insulating resin of 1 mm between shaft 16 and rotor iron core 31. Using the brushless motor of such rotor specification, without short-circuiting bracket 17 and stator iron core 11, the axial voltage and the axial current were measured in the same method as in the first exemplary embodiment. The materials used for integral forming were syndiotactic polystyrene (SPS) resin (XAREC S120) of Idemitsu Petrochemical Corporation, and polybutylene terephthalate (PBT) resin of dielectric constant of 3.6. On the outer circumference of rotor iron core 31, rare earth magnetic powder is mixed with about 3 wt. % of epoxy resin, and formed into a ring form, and heated and cured, and the obtained rare earth resin magnets are adhered.

The rotor in comparative example 1 is formed by press-fitting shaft 16 into the inner circumference of rotor iron core 31, and resin is not present between shaft 16 and rotor iron core 31. On the outer circumference of rotor iron core 31, same rare earth resin magnets as in the fifth exemplary embodiment are adhered on the outer circumference of rotor iron core 31.

COMPARATIVE EXAMPLE 5

In the brushless motor of the same stator specification as in the first exemplary embodiment, the rotor is formed by press-fitting shaft 16 into the inner diameter of rotor iron core 31, and resin is not inserted between shaft 16 and rotor iron core 31. On the outer circumference of rotor iron core 31, ferrite resin magnets are adhered to the outside of rotor iron core 31. Using the brushless motor of such rotor specification, without short-circuiting bracket 17 and stator iron core 11, the axial voltage and the axial current were measured in the same method as in the first exemplary embodiment. Ferrite resin magnets are formed by mixing polyamide resin by about 10 wt. % in ferrite magnets, and shaping into a ring, and the thickness is about 4 times larger than in the rare earth resin magnets.

The measuring results of the fifth exemplary embodiment, comparative example 1 and comparative example 5 are shown in Table 5.

TABLE 5

| | | Fifth exemplary embodiment | Comparative example 5 | Comparative example 1 |
|---|---|---|---|---|
| State between rotor core and shaft | | With insulating resin | Without insulating resin | Without insulating resin |
| Dielectric constant of insulating resin between rotor core and shaft | | 2.8 | 3.6 | — | — |
| Magnet material | | Neodymium bonded magnet | Neodymium bonded magnet | Ferrite resin magnet | Neodymium bonded magnet |
| Measuring state | | Not short-circuited | Not short-circuited | Not short-circuited | Not short-circuited |
| Electrostatic capacity between stator iron core and bracket (bearing outer ring) | pF | 32 | 33 | 31 | 32 |
| Electrostatic capacity between stator iron core and shaft (bearing inner ring) | pF | 35 | 44 | 63 | 85 |
| Change rate of electrostatic capacity to comparative example 1 reference | % | −59 | −48 | −26 | — |
| Impedance $Z_{ST}$ between stator iron core and bracket (bearing outer ring) | kΩ | 460 | 469 | 448 | 486 |
| Impedance $Z_{RT}$ between stator iron core and shaft (bearing inner ring) | kΩ | 426 | 333 | 244 | 186 |
| Change rate of impedance $Z_{RT}$ to comparative example 1 reference | % | 129 | 79 | 31 | — |
| Rate of $Z_{ST}$ on $Z_{RT}$ reference | % | 8 | 41 | 84 | 161 |
| Voltage Vs of bearing outer ring | V | 105 | 100 | 120 | 116 |
| Voltage Vr of bearing inner ring | V | 152 | 168 | 196 | 228 |
| Axial voltage Vs − Vr or Vr − Vs | V | 47 | 68 | 76 | 112 |
| Axial current | μA | 195 | 215 | 397 | 416 |

As clear from Table 5, by interposing insulating resin 311 between rotor iron core 31 and shaft 16, the electrostatic capacity between stator iron core 11 and shaft 16 (bearing inner ring) is lowered, and impedance Zrt3 at the rotor side is heightened. As a result, inner ring voltage Vr of bearing 15 is lower, and the axial voltage can be reduced. The axial current can be also decreased along with lowering of the axial voltage. Further, by selecting a material of dielectric constant of 3.0 or less as insulating resin 311 between rotor iron core 31 and shaft 16, the axial voltage and the axial current can be further decreased.

In the foregoing descriptions, an example of electric motor is explained as the brushless motor applied in an air conditioner as the electric device, but in addition to the air conditioner outdoor unit and air conditioner inner unit, the invention may be applied in various electric motors used in water heater, air cleaner, dish washer, other information processing devices, or industrial appliances.

Industrial Applicability

The electric motor of the present invention can decrease the axial voltage, and is appropriate for preventing occurrence of electrolytic corrosion of bearing. Accordingly, in electric devices mainly expected to be lower in price and longer in life, it is effective in electric motors used in air conditioner indoor unit, air conditioner outdoor unit, water heater, air cleaner, dish washer, and other devices.

The invention claimed is:

1. An electric motor comprising:
a stator including a stator iron core having a stator winding,
a rotor including a rotary member holding a plurality of permanent magnets in a peripheral direction opposite to the stator and a shaft tightening the rotary member so as to penetrate through the center of the rotary member,
a bearing for supporting the shaft, and
a bracket for fixing the bearing, and further comprising:
an impedance adjusting member, wherein the impedance adjusting member is a matching member for matching a) the impedance between the stator iron core and an inner ring of the bearing, with b) the impedance between the stator iron core and an outer ring of the bearing.

2. The electric motor according to claim 1, wherein the matching member is a member having an impedance component interposed between the stator iron and the bracket.

3. The electric motor according to claim 2, wherein the stator iron core and the bracket are electrically connected with each other by the member having an impedance component.

4. The electric motor according to claim 2, wherein the member having an impedance component is at least one of a dielectric element and a resistive element.

5. The electric motor according to claim 1, wherein on the basis of the impedance between the stator iron core and the inner ring of the bearing as the reference, the impedance between the stator iron core and the outer ring of the bearing is set in a range of plus 10% to minus 75% of the reference.

6. The electric motor according to claim 1, wherein the stator winding of the stator iron core is molded and formed integrally by an insulating resin to compose a housing member, and
the bearing is formed of a pair of bearings,
one bearing being provided inside of the housing member and other bearing being fixed to the bracket.

7. The electric motor according to claim 6, wherein the matching member is an element having an impedance component interposed between the stator iron core and the bracket.

8. The electric motor according to claim 7, wherein the stator iron core and the bracket are electrically connected with each other by the member having an impedance component.

9. The electric motor according to claim 7, wherein the element having an impedance component is at least one of a dielectric element and a resistive element.

10. The electric motor according to claim 6, wherein on the basis of the impedance between the stator iron core and the inner ring of the bearing as the reference, the impedance between the stator iron core and the outer ring of the bearing is set in a range of plus 10% to minus 75% of the reference.

11. The electric motor according to claim 1, wherein the stator has the stator winding applied on the stator iron core insulated by a resin, and
the resin is used as the impedance adjusting member, and the dielectric constant of the resin is set at 3.0 or less.

12. The electric motor according to claim 11, wherein the stator winding of the stator iron core is molded and formed integrally by an insulating resin to compose a housing member, and
the bearing is formed of a pair of bearings,
one bearing being provided inside of the housing member and other bearing being fixed to the bracket.

13. The electric motor according to claim 1, wherein the stator has the stator winding wound on the stator iron core insulated by a resin,
the stator winding of the stator iron core is molded and formed integrally by an insulating resin to compose a housing member, and
the bearing is formed of a pair of bearings,
one bearing being provided inside of the housing member and other bearing being fixed to the bracket, and
the insulating resin is used as the impedance adjusting member, and the dielectric constant of the insulating resin is set at 3.0 or less.

14. The electric motor according to claim 1, further comprising an inverter of pulse width modulation system for driving the winding wound on the stator iron core.

15. An electric device having the electric motor of claim 1.

16. The electric motor comprising,
a stator including a stator iron core having a stator winding,
a rotor including a rotary member holding a plurality of permanent magnets in a peripheral direction opposite to the stator and a shaft tightening the rotary member so as to penetrate through the center of the rotary member,
a bearing for supporting the shaft, and
a bracket for fixing the bearing, and further comprising:
an impedance adjusting member, wherein the impedance adjusting member is a matching member for matching a) the impedance between the stator iron core and an inner ring of the bearing, with b) the impedance between the stator iron core and an outer ring of the bearing,
wherein the matching member is a member having an impedance component interposed between the outer circumference of the rotary member and the shaft.

17. The electric motor according to claim 16, wherein the member having a impedance component insulates and isolates between the outer circumference of the rotary member and the shaft.

18. The electric motor according to claim 17, wherein the member having a impedance component is an insulating resin for insulating and isolating between the outer circumference of the rotary member and the shaft.

* * * * *

UNITED STATES PATENT AND TRADEMARK OFFICE
CERTIFICATE OF CORRECTION

PATENT NO.       : 8,525,374 B2
APPLICATION NO.  : 12/666072
DATED            : September 3, 2013
INVENTOR(S)      : Mizukami et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this
Fifteenth Day of September, 2015

Michelle K. Lee
*Director of the United States Patent and Trademark Office*